United States Patent [19]

Kittirutsunetorn

[11] Patent Number: 5,051,720
[45] Date of Patent: Sep. 24, 1991

[54] REMOTE CONTROL SYSTEM USING POWER LINE OF REMOTE SITE

[75] Inventor: Kitti Kittirutsunetorn, Sunnyvale, Calif.

[73] Assignee: Secure Telecom, Inc., Sunnyvale, Calif.

[21] Appl. No.: 435,644

[22] Filed: Nov. 13, 1989

[51] Int. Cl.⁵ .......................................... H04M 11/04
[52] U.S. Cl. ................................ 340/310 R; 340/827; 340/310 A; 340/310 CP; 375/36
[58] Field of Search ........ 340/310 R, 340 A, 310 CP, 340/827, 825.21, 825.2, 825.29; 375/36

[56] References Cited

U.S. PATENT DOCUMENTS

| | | |
|---|---|---|
| 4,206,444 | 6/1980 | Ferlan . |
| 4,223,313 | 9/1980 | Chabol . |
| 4,608,552 | 8/1986 | Boutonnat et al. ............. 340/310 R |
| 4,639,714 | 1/1987 | Crowe ............................ 340/310 R |
| 4,647,721 | 3/1987 | Busam et al. . |
| 4,701,946 | 10/1987 | Oliva et al. . |
| 4,723,269 | 2/1988 | Summerlin . |
| 4,760,375 | 7/1988 | Stecker ........................... 340/310 A |
| 4,809,163 | 2/1989 | Hirosawa et al. . |
| 4,812,963 | 3/1989 | Albrecht et al. . |
| 4,899,131 | 2/1990 | Wilk et al. ....................... 340/518 |

Primary Examiner—Donnie L. Crosland
Attorney, Agent, or Firm—Skjerven, Morrill, MacPherson, Franklin & Friel

[57] ABSTRACT

A system for controlling power at a remote site includes a two channel modem having a first channel dedicated for transmitting power controlling messages to power control modules and a second channel dedicated to transmitting data messages to computerized equipment. The power control modules include a master control module which is plugged into a power line extending through the remote site and one or more slave modules also coupled to the remote site power line for receiving therethrough power control signals transmitted by the master control unit. A user located at a site distant from the remote site may turn power on, off or dim the power to any of a plurality of appliances which are coupled to the remote power line by way of slave power control units.

23 Claims, 8 Drawing Sheets

REMOTE CONTROL SYSTEM USING POWER LINE OF REMOTE SITE

BACKGROUND OF THE INVENTION

1. Field of the Invention

The invention disclosed here relates generally to remote control of computerized equipment and more specifically to remote control of the power supply of a computer system and/or other electrical devices.

2. DESCRIPTION OF THE RELEVANT ART

The advantages of being able to turn on and off the power supply of a computer system located at a remote site are well known. U.S. Pat. No. 4,206,444 "Remote Power Controller Utilizing Communication Lines" issued June 3, 1980 to Ferlan, for example, discusses the advantages of reducing power consumption and the danger of unintended turn-on. The Ferlan disclosure is incorporated herein by reference. According to the Ferlan patent, a comparator is interposed at the remote site between a modem and a gate activated power relay. The comparator scans through incoming serial signals from the modem searching for a predetermined sequence, and when this sequence is detected, the gate controlled relay is turned either on or off to thereby supply electrical power to a computer power unit.

A disadvantageous aspect of the Ferlan design is that incoming messages to the modem must be restricted so that the predetermined power turn-on or turn-off sequence is not included when such turn-on or turn-off is not desired. It is possible for binary bit stream to randomly include this sequence, and if such a sequence is randomly generated, an undesirable activation of the power controlling relay may take place.

Another disadvantage of the Ferlan design is that the receiving modem at the remote site needs to be closely placed to the power control unit and to the computer which is to be turned on or off. This limits the flexibility of users in being able to move their computer equipment from one location to another within the remote site without having to also move the receiving modem and its adjunctive telephone wires.

Other works in the field of remote control which Applicant is aware of include U.S. Pat. No. 4,701,946 "Device for Controlling the Application of Power to a Computer" issued Oct. 20, 1987 to Oliva, et al.; U.S. Pat. No. 4,723,269 "Method and Apparatus for Power-Up of Unattended Computer" issued Feb. 2, 1988 to Summerlin; U.S. Pat. No. 4,647,721 "Telephone Activated Power Controller" issued Mar. 3, 1987 to Busam, et al.; U.S. Pat. No. 4,809,163 "Computer System with Power Control Based on the Operational Status of Terminals" issued Feb. 28, 1989 to Hirosawa, et al.; and U.S. Pat. No. 4,812,963 "Plural Cooking Computer Communication System" issued Mar. 14, 1989 to Albrecht, et al.

SUMMARY OF THE INVENTION

It is an object of the invention to provide users with a low cost and flexible system for controlling power to computerized equipment and/or other electrical devices at a remote site.

In accordance with a first aspect of the invention, there is provided a master power-control unit, coupled to the AC power lines of the remote site for transmitting power control signals along the AC line to one or more corresponding power-control slave units, which are also coupled to the remote AC line for receiving control signals from the master unit. The master power-control unit is operatively coupled to one channel of a multi-channel modem. The one channel of the multi-channel modem is dedicated to transmitting control signals between the master power-control unit and a local-site control system located away from the remote site. Because the one channel is dedicated to transmitting only signals which are for control of the master power unit and its slaves, there is no danger that other transmissions will trigger an unintended action by the master power-control unit.

In accordance with a second aspect of the invention, the multi-channel modem at the remote site includes header detection means for detecting a message-routing field in a header portion of incoming message packets and for directing message packets intended for the one-channel which is coupled to the master power control unit, to that one channel, while directing messages intended for other channels (as indicated by the message-routing field) to the other channels.

In accordance with a further aspect of the invention, a local-site computer system is provided for converting English-like commands such as "TURN ON APPLIANCE NUMBER 1" into binary signals of a format matching the control format of the master power-control unit and for generating a message packet header which includes message-routing information for selecting the one channel at the remote site which is dedicated to the master power-control unit. The local-site computer system is further provided with switching means for automatically switching the message-routing information (field) of the header from one designating the channel of the master power-control unit of the remote site to one designating another channel at the remote site, which for example, is coupled to a remote-site computer whose power is controlled by a slave power unit that is responsive to control signals from the master power-control unit.

In accordance with a further aspect of the invention, the modems at the local and remote sites are provided with a multiplicity of bypassable functions including: a first function for adding a router header and optional router tail to a message which is to be routed; a second function for encrypting a core message packet which includes the message body and optionally includes a router header and tail; a third function for compressing and/or adding a protocol envelope to the optionally-encrypted core message packet; a fourth function for optionally stripping off the protocol envelope of a protocol enveloped and compressed message core, decompressing the core, and for performing any error correction or handshaking subfunctions associated with the protocol; a fifth function for optionally decrypting the optionally encrypted message core; and a sixth function for optionally stripping off the router header and tail portions of the message core and routing the message body according to the routing-field information within its router header. A seventh function is further provided for optionally converting a message from an English-like command structure to one matching the format of a preselected master power-control unit. Other aspects of the invention will become apparent from the below detailed description.

DETAILED DESCRIPTION OF THE PREFERRED EMBODIMENTS

The following is a detailed description of the best modes presently contemplated by the inventor for carrying out the invention. It is to be understood that these modes are merely exemplary of the spirit and principles of the invention and that the description of these modes should not be taken in a limiting sense.

Figure 1:
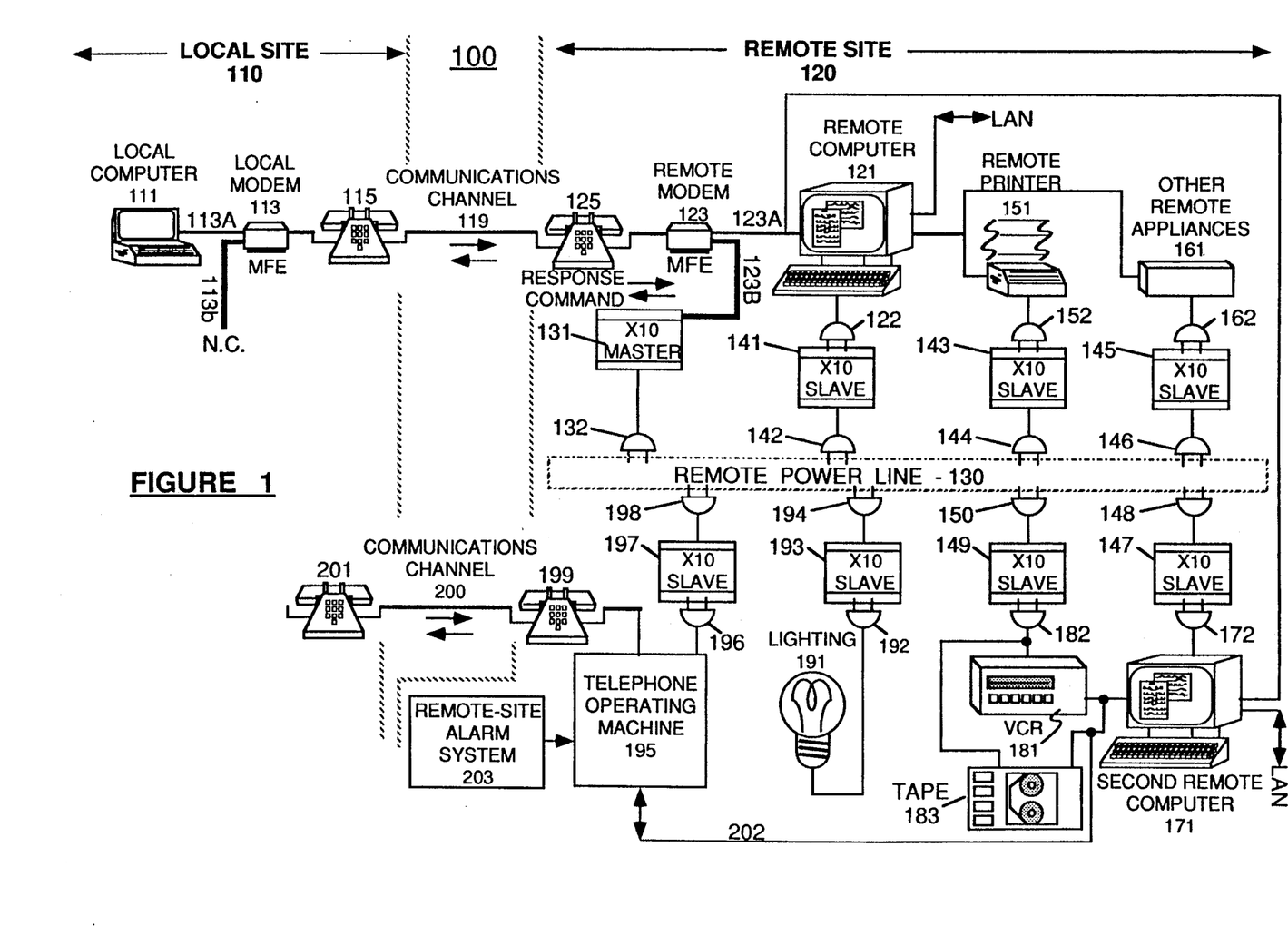
FIG. 1 is a block diagram of a remote power control system in accordance with the invention.

Referring to FIG. 1, a remote control system 100 in accordance with the invention is shown. The control system 100 allows a user (not shown) at a local site 110 such as a hotel room or a satellite office to control computerized equipment at a remote site 120 (i.e., home or base office) using an ordinary local to remote site communications channel 119 such as a telephone network.

Figure 2:
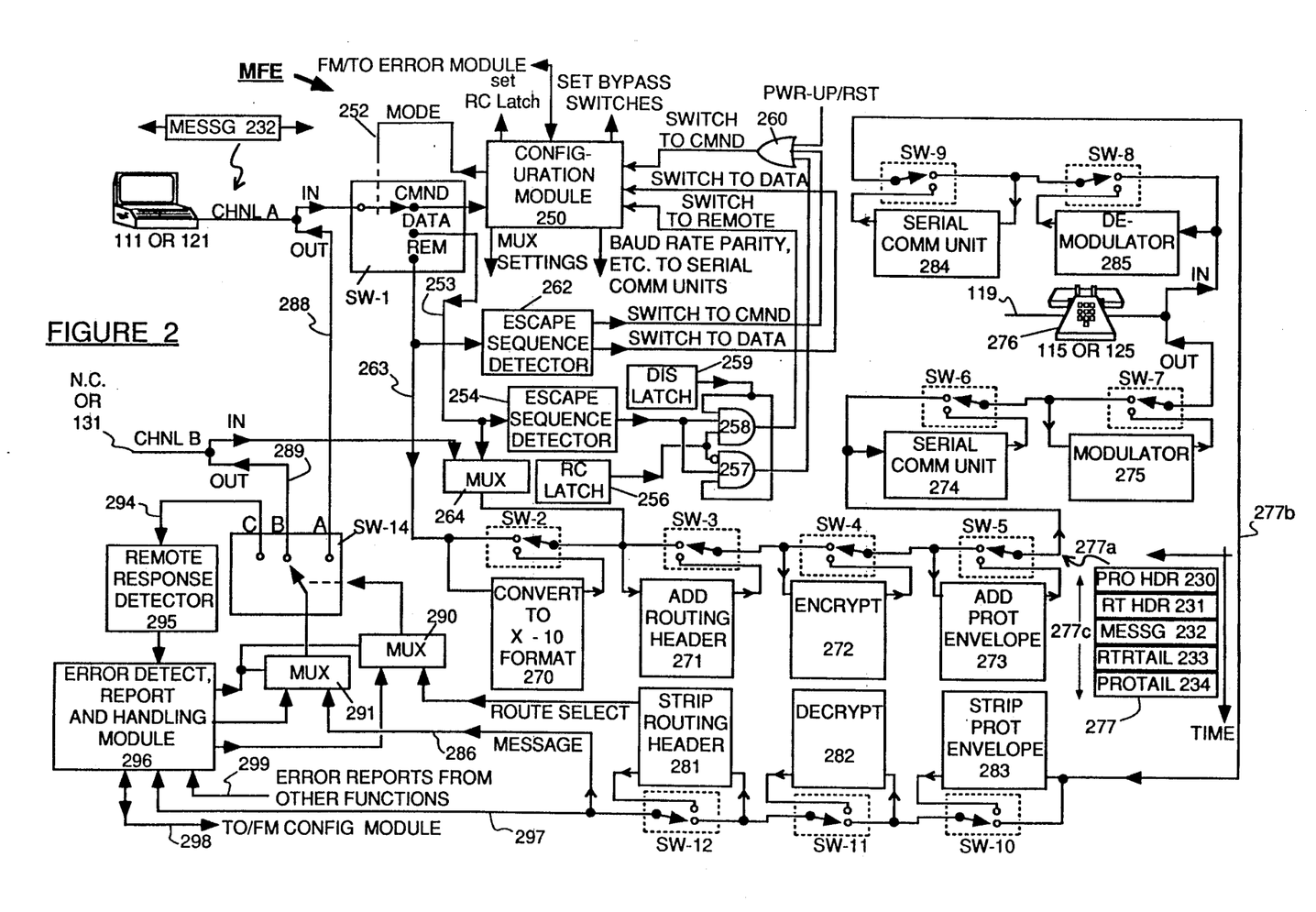
FIG. 2 is a block diagram of a MultiFunction Encryptor (MFE) device according to the invention.

At the local site 110, a local computer 111 (i.e., a so-called "laptop" or "portable" microcomputer) is operatively coupled (i.e., through an RS-232 serial communication link) by way of a first modem channel 113a to a local modem 113 which in turn is coupled through appropriate network interface means 115 (i.e., Bell 103) to the local-remote communications channel 119. The local modem 113 is preferably a multi-function encryptor (MFE) device, as shown in FIG. 2, having a second modem channel 113b to which no connection (N.C.) needs to be made for the arrangement 100 of FIG. 1. The MFE device will be described in detail later.

At the remote site 120, a corresponding network interface means 125 (i.e., Bell 103) connects the local-remote communications channel 119 to a multi-channel remote modem 123 (again, preferably an MFE device as shown in FIG. 2 which is to be described later). One channel 123b of the multi-channel remote modem 123 is coupled to a master power-control unit 131 such as an X10 ™ "Powerhouse" master power module available from X-10 (USA) Inc. of Northvale, NJ. Those skilled in the art will recognize that the X-10 ™ system is one of many different through-the-power-line control systems available from different vendors. Additional examples of master power-control units and their slaves may be found for example in U.S. Pat. No. 4,677,566 "Power Control Network For Multiple Digital Modules", issued June 30, 1987 to Whittaker et al.; U.S. Pat. No. 4,643,062 "Power Control Network Using Reliable Protocol", issued Jan. 6, 1987 to Jeppesen et al.; and U.S. Pat. No. 4,864,589 "Spread Spectrum Power Line Communication", issued Sept. 5, 1989 to Endo, the disclosures of all said patents being incorporated herein by reference. In addition to through-the-power-line control systems at the remote site, it is within the contemplation of the present invention to use other through-the-remote site communications schemes such as employing radio links, sharing telephone wiring or computer network wiring for transmitting control signals from a master unit (131) to slave units (141, 143, 145, etc.).

A second channel 123a of the remote modem 123 is coupled to a first remote-site computer 121 (i.e., a so-called "desktop" microcomputer or "engineering workstation" or "minicomputer" or "mainframe" that is more powerful computing-wise than the local-site computer 111). The remote modem 123 to remote computer 121 coupling is preferably a serial channel (123a) which, by way of example, can be an RS-232 serial link. The second channel 123a conducts binary transmissions between the first remote-site computer 121 and the remote modem 123.

The master power-control unit 131 has a power connector 132 plugged into an AC power line 130 which extends through the remote site 120. A first slave unit 141 (preferably an X10 slave module), which may be located a substantial distance (i.e., more than 12 feet) away from the master unit 131, has its corresponding power connector 142 plugged into the remote-site power line 130 for communicating therethrough with the master power-control unit 131. The remote computer 121 has its corresponding power connector 122 plugged into the first slave power control unit 141 so that power may be selectively turned on or off to the remote computer 121 when the master power-control unit 131 issues an appropriate command signal onto the remote-site power line 130.

As shown in FIG. 1, additional pieces of equipment may be further connected to the remote-site power line 130 by way of additional slave power-control modules. A remote-site printer 151 is shown to have its power connector 152 plugged into a second slave module 143 whose respective power connector 144 is plugged into the remote-site power line 130. The remote printer 151 is further operatively coupled by way of an RS-232 or other communications link to the remote computer 121 for receiving print instructions from the remote computer 121. When the remote printer 151 is not needed, its power supply may be shut off by way of commands sent from the master unit 131 to the slave module 143 through the remote-site power line 130 in order to conserve power and increase the operating life of the printer 151. Additional remote appliances 161 such as memory backup devices (i.e., mass storage such as a high capacity disk drive) and so forth may be also be operatively coupled to the remote computer 121 and the power connectors 162 of these additional appliances 161 may be respectively coupled to the remote power line 130 through further slave units 145 having respective connectors 146 plugged into the remote power line 130. The remote site computer 121 is shown to be further coupled to a so-called "local area network" (LAN) to thereby provide a user at the local site 110 with access to the resources (software and/or hardware) of the LAN.

In addition to equipment which communicates with the remote computer 121, there may be further provided additional computer equipment which is not co-operatively coupled to the remote computer 121. By way of example, a second remote-site computer 171, which is located far away (i.e., 12 or more feet) from the first remote computer 121, may have its respective power connector 172 plugged into a fourth slave module 147 whose corresponding electrical connector 148 is also operatively coupled to the remote-site AC power line 130. The second channel 123a of the remote modem 123 may be coupled to this second remote computer 171, if desired, so that communication may take place between the local site 110 and the second remote computer 171 when the latter computer is powered up. The first remote computer 121 is not powered up at this time so that the second channel 123a may be shared by both the first and second remote computers, 121 and 171, on a one at a time basis. Alternatively, a separate communications channel (i.e., 123c not shown) may be provided on the remote modem 123 for exclusive use by the second remote computer 171 so that contention for a single channel (123a) does not take place between the first and second remote computers, 121 and 171.

Users may further wish to attach equipment such as a video cassette recorder (VCR) 181 to the system 100 so that the VCR 181 may be selectively turned on or off by way of having its power connector 182 plugged into a fifth slave module 149 whose corresponding power connector 150 is plugged into the remote power line 130. The VCR 181 may be operatively coupled to one of the remote computers (i.e., the second remote computer 171) so that a specific operation of the VCR 181 (i.e., play, record, rewind, etc.) may be selected from the local site 110 when desired by way of communication through the remote computer (i.e., 171). The master power-control unit 131 preferably includes an internal programmable timer (not shown) so that a command can be sent from the local site 110 to the master power-control unit 131 to turn on or off any one of its slave modules at a prespecified time after the time of the command transmission from the local site 110.

Furthermore, lighting devices 191 provided at the remote site 120 may be turned on, off or dimmed by connecting these lighting devices 191 through one or more appropriate connectors 192 to yet a further set of one or more slave modules 193 whose corresponding power connectors 194 are operatively coupled to the remote power line 130 for receiving commands from the master power module 131. The lighting devices 191 may be commanded from the local site 110 to turn on, off or dim at random times in order to give the remote site 120 the appearance of being occupied and to thereby provide security for the remote site 120. The timings of such events may be controlled by setting from the local site 110, the internal timer (not shown) of the master power-control unit 131. If desired, additional security may be provided to the remote site 120 by having a tape recorder 183 randomly powered up to provide noise at the remote site 120 as an additional security measure. Furthermore, to secure messages on an automatic telephone operating machine (i.e., automatic telephone answering machine) 195, power is controllably applied to a telephone answering/playback part of the machine 195 by way of connecting the power connector 196 of the telephone operating machine 195 to a slave power unit 197 whose corresponding power connector 198 is coupled to the remote power line 130. The telephone answering/playback portion of the telephone operating machine 195 will not be able to playback recorded messages through a telephone network 199, 200, 201 unless power is supplied to the telephone operating machine 195 by way of its slave power module 197. The telephone operating machine 195 may optionally include an auto-dial unit which can automatically place calls out through the remote-site telephone equipment 199 to contact prespecified parties (i.e., police, fire department, doctor, etc.) in the event of an emergency and to play to such parties a prerecorded message stored in a tape-unit (not shown) of the telephone operating machine 195. As indicated in FIG. 1, one of the remote-site computers 121 or 171 could be coupled by way of a link 202 to such an emergency auto-dialer (195) in order to monitor or control its state and report the status of the machine 195 to the local site 110 or to activate the machine 195 according to commands received from the local site 110. Moreover, alarm systems 203 for detecting and reporting intrusion or fire/gas at the remote site 120 may be coupled to the telephone operating machine 195 for automatically initiating autodial operations when an emergent condition is detected.

With the system configuration 100 of FIG. 1, a user at the local site 110 may choose to turn on, off or dim the power to any of a large number of appliances located at the remote site 120. Data files stored within memory components of the remote computers 121, 171 (or in the resources of the LAN to which the computers 121, 171 can be connected) or other mass storage devices 161, are secured from probing by unauthorized persons who might gain access to the remote modem 123 (assumed to be always ON and ready to pick up its telephone receiver) through the communications channel 119. Until an appropriate power turn on command is sent through the remote modem 123 to the master power unit 131 of the remote site 120 to thereby apply operating power to such data file supporting devices (i.e. 121, 161, 171, LAN), these devices will not respond to requests sent through the remote modem 123 for data access. Preferably, the local modem 113 and remote modem 123 have corresponding data encryption and decryption devices (as will be described with reference to FIG. 2) so that only those users who are in possession of an appropriate encryption/decryption key may be able to send intelligent control signals to the master control unit 131 and/or to the remote computers 121 and 171 for activating these devices.

Additionally, with the configuration 100 of FIG. 1, a user at the remote site 120 can also use the remote MFE 123 to control power application at the remote site 120 by sending appropriate commands from computer 121 through MFE 123 to power unit 131.

Referring to FIG. 2, the operations of the local and remote modems, 113 and 123, will now be explained in more detail. Each of the modems, 113 and 123, is preferably designed according to the MFE structure shown in FIG. 2. An MFE (multi-function encryptor) device as shown in FIG. 2 includes a mode selecting means (i.e., switch) SW-1 for placing the MFE in one of at least three modes: a command mode, a data mode and a remote control mode. The mode selecting switch SW-1 is responsive to a mode-select signal sent from a configuration module 250 of the MFE along mode-select line 252. When power is first applied to the MFE or the MFE is reset, the configuration module 250 performs a system initialization operation in which a plurality of function-bypass switches (SW-2 to SW-12), multiplexers (i.e., 264, 290, 291) and latches (i.e., 256, 259) are placed in initial states, as will be understood shortly. Upon initialization, the configuration module 250 further issues a signal along mode-selecting line 252 to place the mode-selecting switch SW-1 in the command ("Cmnd") mode.

In the command mode, data from a first channel (chnl A) of the MFE is routed to the configuration module 250 for allowing an external control computer (111 at the local site and/or 121 at the remote site) to send configuration commands to the configuration module 250 for configuring a multiplicity of other units (i.e., switches SW-1 through SW-12, SW-14, latches 256 and 259, function units 270-275 and 281-285, error module 296 and multiplexers 264, 290 and 291) within the MFE. As shown in FIG. 2, the MFE comprises a multiplicity of interconnectable functional units, i.e. 270 through 275 and 281 through 285, whose functions may be selected or bypassed by appropriate setting of corresponding function-bypass switches SW-2 through SW-12. The MFE further comprises a series of multiplexers and other signal routing switches (264, 290, 291 and SW-14) for routing messages from a variety of sources to a variety of destinations as will be described below. Moreover, the MFE comprises a set of escape sequence detectors, 254 and 262, for detecting the presence of escape sequences on respective lines, 253 and 263, as well as a remote response detector 295 for detecting a response message (i.e., master power unit acknowledge signal) sent from a unit (131) at the remote site and an error detecting, reporting and handling module 296 for detecting the occurrence of transmission errors, recovering from those errors, and reporting the same to an appropriate monitor means (i.e. the local computer 111 or remote computer 121).

The operations of the MFE may be best explained by walking through its various operating modes. After power-up of the MFE, one of the configuration commands which the configuration module 250 may receive in the initial command mode ("cmnd") is a command to set or reset an internal remote-control latch (RC latch) 256. When the RC latch 256 is reset to output a logic low to AND gates 257 and 258; and further an escape enable latch (Esc En) 259 of the MFE is set to output a logic high to the AND gates 257 and 258; the MFE is configured to operate as a standard modem and to switch back and forth between the command (Cmnd) and data modes upon receipt of appropriate command sequences (i.e. ATA, ATD, ATO, which respectively are Hayes ® recognized command words for answer, dial and go on-line) when the MFE is in the command mode or upon receipt of a suitable escape sequence (i.e. pause−+++−pause) when the MFE is in the data mode. The mode selecting switch SW-1 remains in the command setting until after the configuration module 250 receives one of a preselected set of automatic answer, dial, on-line, etc. commands (i.e., ATA, ATD, or ATO) which force the MFE to switch to the data mode and automatically perform the tasks of dialing and connecting with a modem (or other MFE) at the other end of its modem-to-modem communications line 119.

In the data mode, messages 232 originating from a computer 111 or 121 that is coupled to channel A are routed by way of data line 253 through a first input-channel-selecting multiplexer 264 to a first header/tail adding unit 271 which may optionally add a message routing header 231 in front of the message body 232 and a router tail 233 after the message body 232 to thereby form a message core 277c (composed of body 232 and optionally of header 231 and tail 233) which core 277c is then sent to an encryption unit 272. The encryption unit 272 optionally (depending on the setting of bypass switch SW-4) encrypts the message received from the router header/tail adding unit 271 (or from its bypass switch SW-3), preferably according to the National Bureau of Standards DES data encryption standard or according to some other algorithm chosen by the user, the algorithm and keys having been set by the configuration module during the command mode. The optionally encrypted message core 277c* (asterisk means it is optionally encrypted) is then passed to a data compressor and protocol envelope adder 273 which optionally compresses the core 277c* (according to an MNP TM compression scheme, for example), adds a protocol header 230 and protocol tail 234 to the core 277c* before sending the resulting packet 277 (composed of 230, 277c* and 234 in the recited order) to a serial communication unit 274. The preferred protocol envelope 230 and 234 is preferably established according to the so-called MNP TM system available from Microcom Inc. of Sherman Oaks, CA. Other protocol formats such as LAP-M or V.42 available from CCITT may be used as well. Such communication protocols are well known in the industry and do not have to be explained here.

With regard to the router header 231 which was inserted at the front of the message body 232 by the router header adding unit 271, this router header 231 includes a first information field of one or more bits (not shown) for routing the message 232 to one of a plurality of destinations (i.e., points A, B or C of switch SW-14) within a receiving unit (receiving MFE), as will become apparent shortly. The router header 231 may further include a second information field of one or more bits for defining the size of the message body 232 and the size of the optional tail 233 that follows the body 232. The router tail 232 which is optionally added after the message body 232 may include ECC code (not shown) for performing error correction on the router header 231 and the message body 232 at the receiving end (receiving MFE) if so desired. The ECC code may be for error detection and/or correction by way of checksum, cyclical redundancy, FIR code or other methods well known in the art.

The transmission packet 277 which emerges on line 277a from the data compressor/protocol envelope adder 273 or its bypass switch SW-5 will include, as shown, the message body 232 and optionally, as part of a optionally encrypted and compressed core 277c*, the router header 231 and router tail 233 surrounding this message body 232. The protocol header 230 and protocol tail 234 optionally envelope the core 277c*. This transmission packet 277 is then sent to the serial communication unit 274 for transmission at a preselected baud rate out on the modem-to-modem communications line 119 emerging from the message sending MFE. The transmission (baud) rate, parity setting, and other parameters of the serial communication unit 274 are preset by the configuration module 250 during the command mode of the MFE. The serial output signal of the serial communication unit 274 is passed through a modulator 275 for conversion (i.e., frequency modulation) into a modulated signal that is compatible with the modem-to-modem communications channel 119 on which it will be sent. An appropriate network interface means 115 or 125 (i.e. Bell 103/212A or other) may be interposed between the modulator 275 and the channel 119 if desired.

At the other end of the modem-to-modem communications channel 119, another (message receiving) MFE, such as MFE 123 of FIG. 1, for example, will receive the modulated and transmitted signal through its demodulator unit 285. The demodulator 285 produces a demodulated signal that is sent within the receiving MFE to a complementary serial communication unit 284 whose receiving baud rate, parity, etc. factors have been preset during the command mode of the receiving MFE (123) for conversion back into the message packet format 277 shown in FIG. 2. The received message packet 277 is then passed through return line 277b to a protocol envelope stripper/decompressor 283 which strips off the protocol header 230, strips off the protocol tail 234, performs the necessary data-decompression and handshaking steps required for the MNP TM or other protocol and the necessary error detection and/or correction steps. If all is well (no errors detected), the protocol stripped core 277c\* is sent to a decryption unit 282, whose decryption algorithm and keys have been preselected by input from a user to the configuration module 250 of the receiving MFE (123) during the command mode. The core 277c\* is decrypted to recreate the unencrypted core 277c. The unscrambled core packet 277c is then sent to a router header/tail stripping unit 281 which removes the router header 231 and optional router tail 233 from around the message body 232, performing adjunctive error detection and correction steps in the process, and determining the size of the message body 232 from the message-size information within the router header 231. A route select command is generated by the router stripper 281 from the route-selecting field (not shown) of the router header and this route select command is sent through multiplexer 290 to a message routing switch SW-14. (Multiplexer 290 is normally set to pass the route-select command from function unit 281 to routing switch SW-14. In cases where a transmission error is detected, however, error handling unit 296 switches this multiplexer 290 to receive an alternate route select command from it, the error handling unit 296, as will be explained later.) The message body 232 then passes through message forwarding line 286, multiplexer 291 and switch-feeding line 287 to the routing switch SW-14 for routing to one of plural destination points, A, B or C. (Switch SW-14 can have more points, D, E, F, etc., if desired.) In the standard data mode, the routing switch SW-14 is set to the "A" position and the message body 232 will be passed through output point A of message routing switch SW-14 and will pass from there out through the corresponding channel A of the receiving MFE (123) to the receiving computer (121).

If either of the data-decompressing/protocol-stripping unit 283 or router header/-tail stripping unit 281 detect an error in their received messages, an error report is sent on line 299 to an error detecting module 296 which then takes command of the message routing switch SW-14, by appropriate operation of multiplexers 290 and 291 using the multiplexer control line 292. The error detecting, reporting and handling module 296 may send an error report to either or both of channel A and channel B for display on an appropriate monitor (i.e. the message receiving computer 121). The error detect unit 296 has an additional tap line 297 for monitoring all messages coming out of routing stripper 281 or its bypass switch SW-12. If the tapped message appears to contain an error, unit 296 can take control of switch SW-14 and report the error to the receiving terminal.

While in the data mode, the sending and receiving MFE's (113 and 123) switch roles back and forth as sender and receiver in the same manner that standard modems do. Thus messages can be sent back and forth between a call initiating computer 111 (local site) and a call answering computer 121 (remote site).

The data mode may be exited by sending an appropriate escape sequence (i.e. pause—+++—pause) along the data carrying line 253 for detection by the data-mode escape sequence detector 254. When this or another prespecified escape sequence (or escape character) is detected, the escape sequence detector 254 issues a logic high to AND gate 257, and this signal results in the issuance from AND gate 257 of a switch-back to command mode signal which passes through OR gate 260 to the configuration module 250. (AND gate 258 is disabled when the RC latch 256 is reset to output a logic low.) The mode selecting switch SW-1 is then switched back to the command mode position ("Cmnd") and the configuration module 250 may then receive new configuration commands from channel A of its MFE. One such configuration command is "AT/C=RC" which causes the configuration module 250 to set the RC latch 256 to a logic high. A switch may then be made back to the data mode by using the standard channel opening commands ATA, ATD or ATO. These commands perform autodialing and other functions as standardized for examples by Hayes Microcomputer Product, Inc. for opening a channel between a calling modem (MFE) and an answering modem (MFE), as is well known in the art, and these aspects of the operation need not be elaborated here. After a channel is "opened" or otherwise established between the calling modem (i.e. 113 of FIG. 1) and an answering modem (i.e., 123), the calling computer (i.e. 111) sends the escape sequence (pause—+++—pause) through mode-select switch SW-1 to line 253 where it is detected by the data-mode escape sequence detector 254. But, here because the RC latch 256 is now set, the AND gate 258 will send a switch-to-remote command back to the configuration module 250 to place the mode selecting switch SW-1 in the remote position. (AND gate 257 is now disabled by the logic high output by RC latch 256 to the inverting input terminal of AND gate 257.)

Once the remote mode is established (SW-14 is in the "Remote" position), the message body 232 from the calling computer 111 passes through signal carrying line 263 to an optional format conversion unit 270 which converts an English-like ASCII message string in message body 232 from an initial English-like structure (i.e., "ON=A1") into a binary format which is compatible with a X-10 master power-control unit 131 at the remote site or which is compatible with some other power line controlling system at the remote site 120. The format converted message is then sent to the router header-tail adding unit 271 for addition of the router header 231 and router tail 233 (optional). In the remote mode, however, the message routing field of the router header 231 is set to direct the message at the destination MFE 123 to channel B instead of channel A. The optional encryption function 272 and optional data-compressing/-protocol-enveloping function 273 are carried on as described before. The thus handled message is sent through serial communication unit 274, which should have been configured during the command mode to a baud rate compatible with the serial communication requirements of the destination MFE 123. The serial signal is modulated by modulator 275, sent out along the modem-to-modem communication channel 119 to the receiving end where it comes in through demodulator 285 of the answering MFE 123. The received signal is converted from serial to parallel form by the receiving serial communication unit 284 (whose baud rate was automatically switched to be compatible with the calling modem 113 during channel-establishment). The received message passes through the protocol stripper 283, decryptor 282 and router stripper 281 of the receiving MFE 123 as before, but because the route-selecting information field in the router header 231 now designates channel B instead of channel A, the message body 232 that is output from the router stripper unit 281 passes through multiplexer 291, switch-feeding line 287, then through routing switch SW-14, whose setting is now to the B position, and from there to channel B for receipt by the master power-control unit 131. (Channel B of MFE 123 should have been preconfigured to match the baud rate, parity, etc. of the X-10 master unit during the command mode of MFE 123.)

The answering and calling MFE's then both switch from their initial send/receive modes to complementary receive/send modes and the master power unit 131 sends an acknowledgment response back through channel B into the input-channel-selecting multiplexer 264, and from there the response body is handled as before by passing through routing header/tail adding unit 271, and so forth. But in this instance, the router header/tail adding unit 271 of the remote MFE (123) preferably changes the destination selecting field to select channel "C" which will route the response at the receiving MFE (now 113) to its remote response detector 295 rather than to channels A or B. When the master power-control unit's acknowledge or other response finally comes out of the router header/tail stripping unit 281 at the call initiating end (MFE 113 at the local site 110) it is directed through multiplexer 291 and through routing switch SW-14 to position C where it is received by the remote response detector 295 of the local MFE 113. If the response is appropriate, (i.e. the power-master 131 acknowledges its receipt of the power command sent from calling MFE 113 and no error has taken place) the send/receive modes of the MFE's are again reversed and the calling MFE 113 is ready to send another remote command to the remote site 120. If the acknowledgment response from the master power unit 131 is not present or contains an error, then the error detection, handling and reporting module 296 at the local site 110 takes command of the message routing switch SW-14 by sending an alternate routing select command to the multiplexer 290 to set switch SW-14 to one of channels A or B so that an error message (report) can be sent to a monitor attached to either of channel A or channel B (i.e. the calling computer 111 at the local site 110). The report tells the user at the local site 110 what seems to have gone wrong and suggests corrective actions. If desirable, the local modem 113 can try to automatically resend the power-control message a predetermined number of times before requesting user intervention.

When it is desired to leave the remote mode, the calling computer 111 issues an appropriate escape sequence (or escape character) through switch SW-1 to line 263 for detection by the remote escape sequence detector 262. Depending on the escape sequence (or character) which is detected, the remote escape sequence detector 262 issues one of a switch-to-command-mode or switch-to-data-mode signals to the configuration module 250. If the RC latch 256 remains set, later mode switching will be between the data mode and the remote mode whenever an escape sequence is detected by the data mode escape sequence detector 254. If the RC latch 256 is reset in the command mode, then an escape sequence later detected by sequence detector 254 will cause the MFE to switch from the data mode back to the command mode.

Figure 4A:
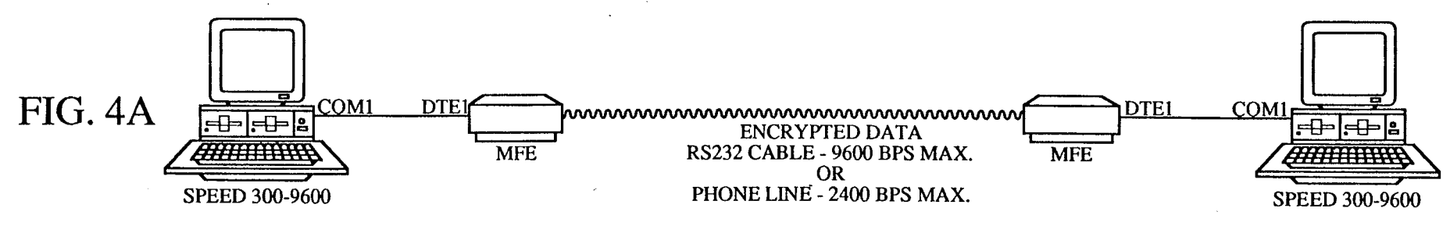
FIGS. 4A-4G show respectively: (A) an MFE to MFE secured connection, (B) a standard non-secured communications connection, (C) a self-encrypt/decrypt connection, (D) a high-speed security connection, (E) a secured MFE to MFE multiplexed connection, (F) a secured multipoint connection, and (G) a secured home control connection.

The MFE of FIG. 2 includes a special escape enable latch 259 which can be reset (to logic low) by the configuration module 250 for allowing random binary sequences of predetermined bit-length (size) to pass through line 253 without causing a switch in mode by the configuration module 250 should an escape sequence be randomly present. This escape-disable setting of latch 259 is used when an entire file is to be passed through the MFE for a special self-encrypt/decrypt mode. In this special mode, only one of the encrypt 272 or decrypt 282 functions is selected to be operational while other functions in the 271 through 275 and 285 through 281 loop are preferably bypassed. Rather than having a message go out through the modem-modem communications channel 119 to another unit, the communication units 274, 275, 285 and 284 are bypassed such that an entire file may be input through channel A, encrypted by unit 272, and passed in encrypted form back out through channel A for storage as an encrypted file in a data receiving device coupled to channel A. This operating mode is shown in FIG. 4C. Clear data is sent to the MFE through channel A and encrypted data is returned through the same channel A. (If desired, the encrypted file can be sent out through channel B by appropriately configuring the routing switch SW-14 during the command mode.) Decryption may be performed by the same path, except the decrypt function 282 is selected and the encrypt function 272 is bypassed As shown in FIG. 4A, the bypass switches SW-2 through SW-14 may be suitably set so that encrypted data can be transmitted between one MFE and another MFE over a communication channel 119. If the modem-to-modem channel 119 is an RS-232 cable then a rate of 9600 bits per second can be obtained If a standard telephone line is used, a reduced rate of 2400 bits per second is preferred.

Figure 4B:
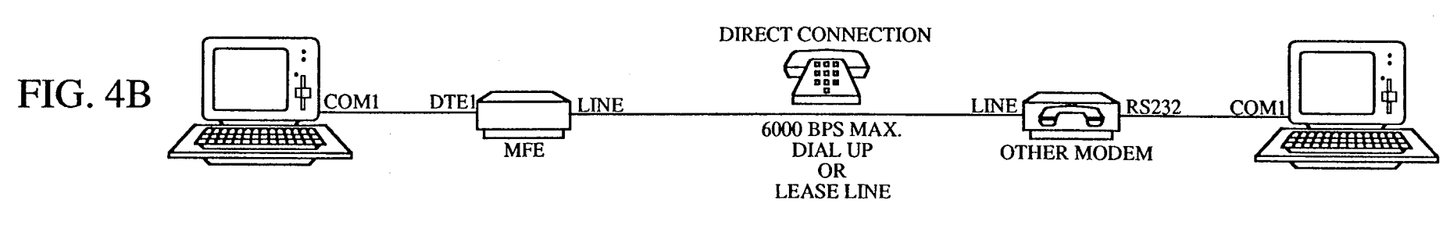
Figure 4C:
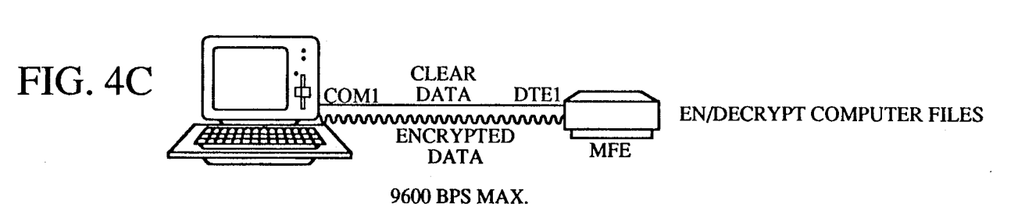

As shown in FIG. 4B, if the encrypt function 272 is bypassed normal communication may take place between a MFE and a standard modem.

Figure 4D:
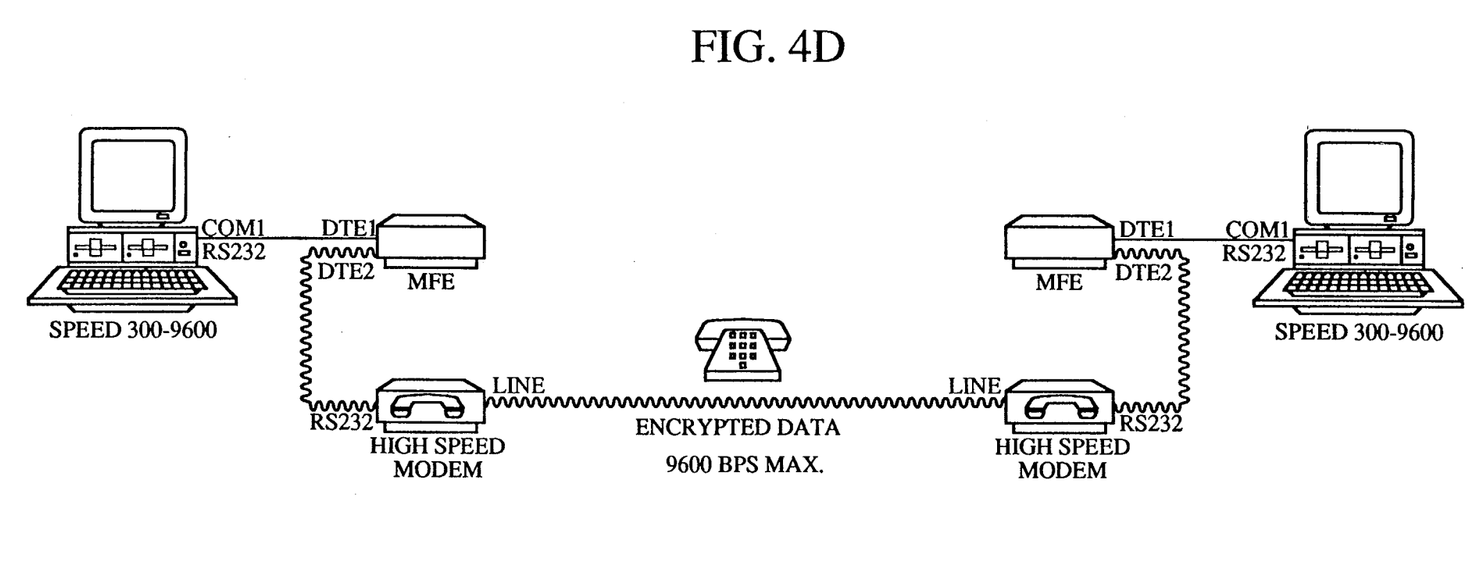

As shown in FIG. 4D, clear data may be input into channel A of a calling MFE, this data can be encrypted and routed out through channel B of the calling MFE, passed into a high speed modem, where the encrypted data is then sent out along a communications channel for receipt by another high speed modem at an answering end. The answering high speed modem feeds the encrypted data into channel B of the answering MFE where it passes through MUX 264 and from there through the functions chain 271–275 and 285–281 (preferably bypassing all of functions 271 through 275 and 281, 283 through 285) to be decrypted by decryption unit 282 and then routed through routing switch SW-14 to channel A for receipt by another computer.

Figure 4E:
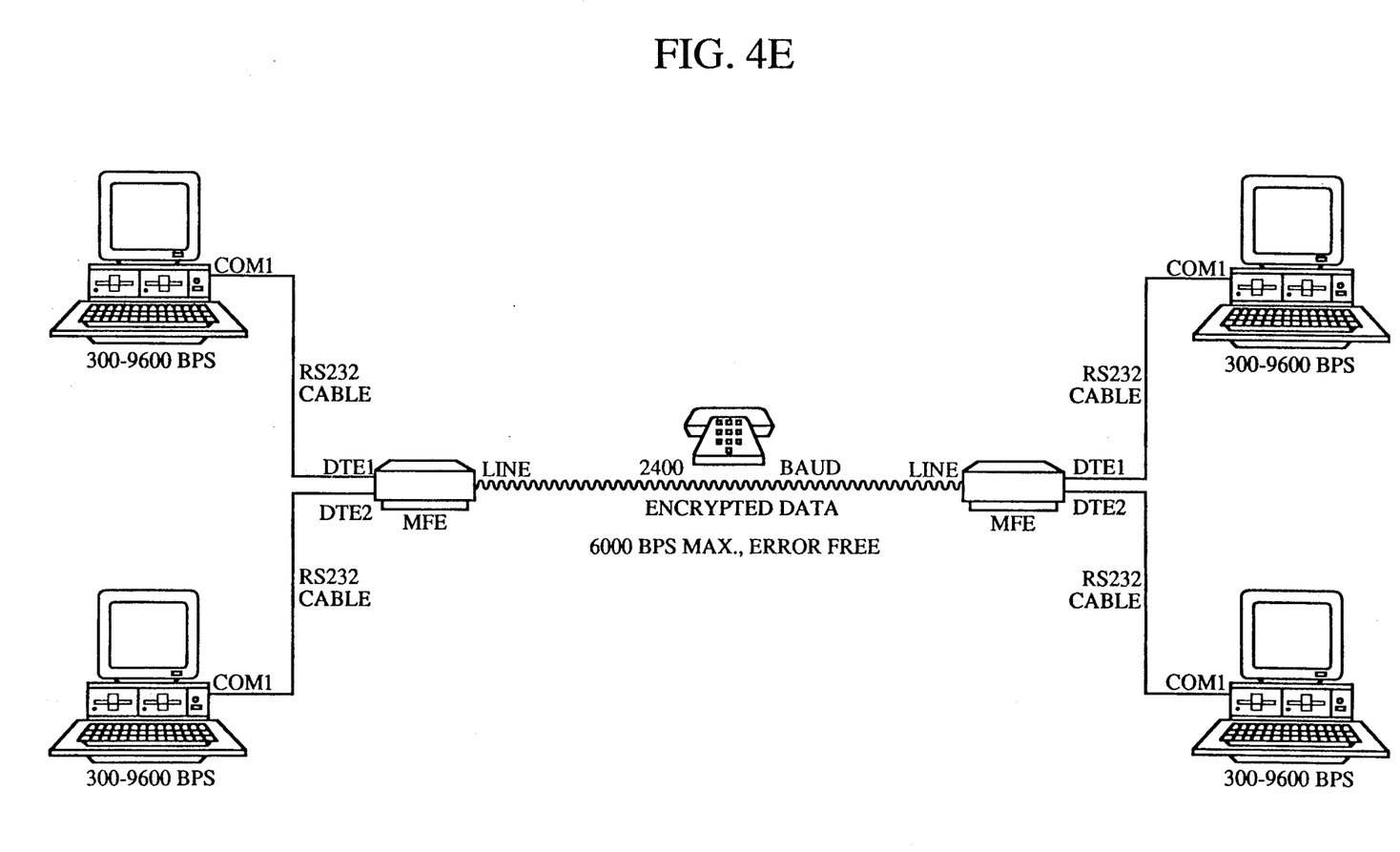

As shown in FIG. 4E, the message routing switch SW-14 and multiplexer 264 may be operated to provide secure data transmission between two channels at a first site and two channels at a second site while using a single modem-to-modem communication line.

Figure 4F:
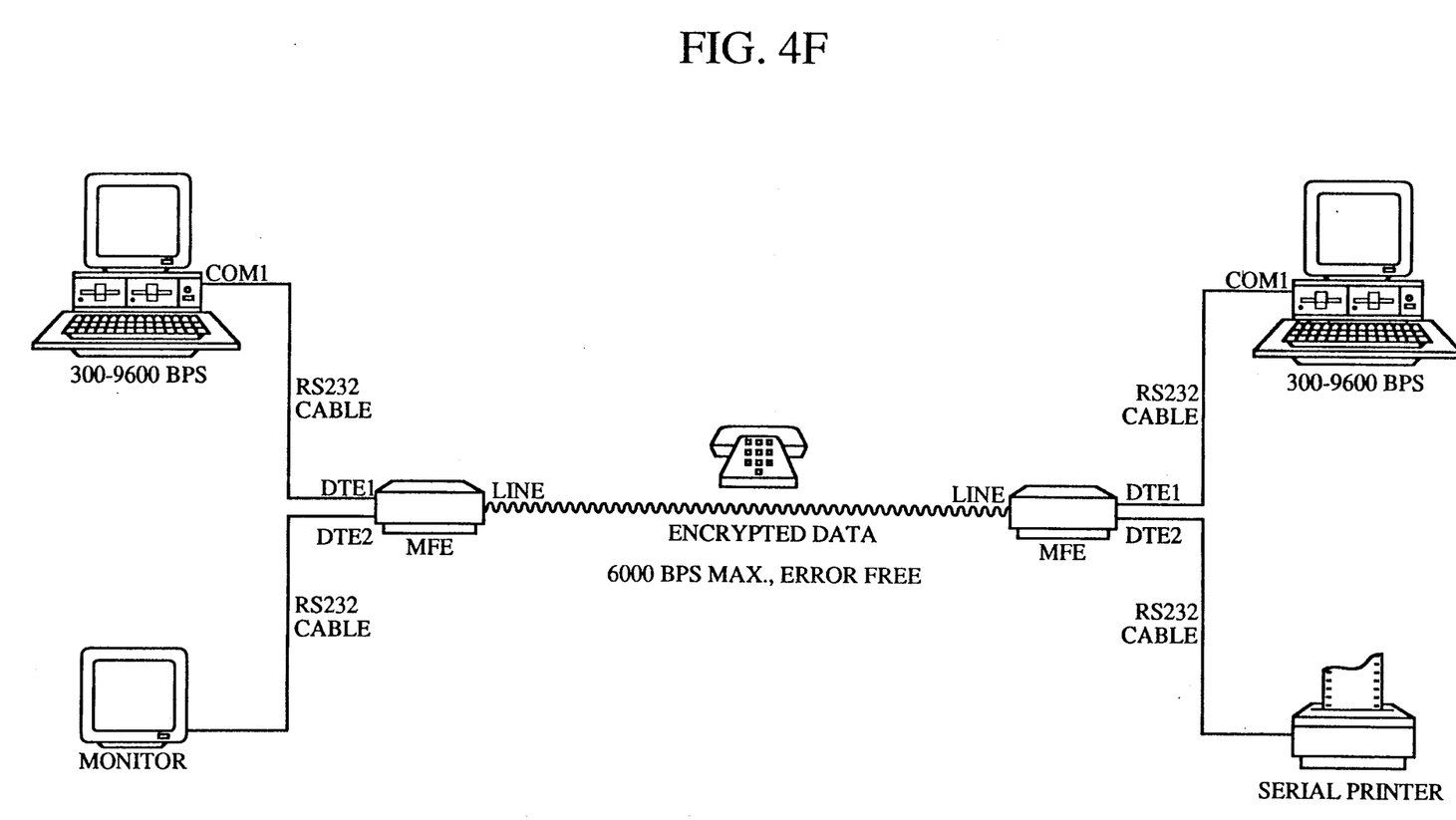

As shown in FIG. 4F, a multipoint operation may be performed by including the appropriate message routing information in the router header 231 of a message sent through a MFE secured transmissions can take place between a computer at one site and a printer, monitor or other peripheral at a distant site. The message routing field of the router header may be used to route messages to a desired one of a multiplicity of destination points (thus, the term multi-point is used here).

Figure 4G:
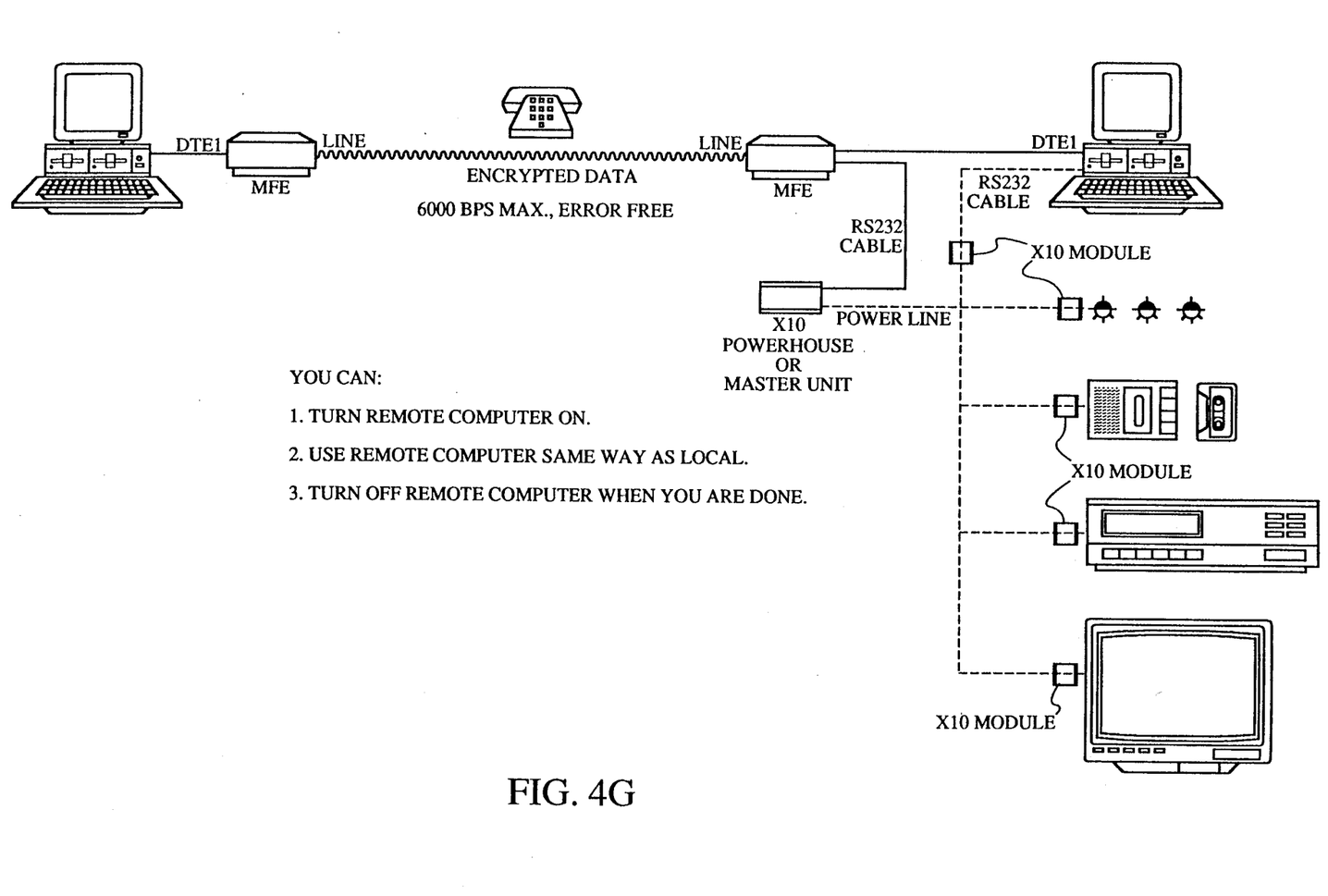

As shown in FIG. 4G, a pair of MFE's may be used to control over an encryption-secured line, various appliances in the home (i.e., home computer, lights, tape recorder/player, VCR and television set) from a remote location.

With respect to the design of an MFE shown in FIG. 2, those skilled in the art will of course appreciate that most of the functions illustrated in FIG. 2 may be performed by a general purpose computer operated with appropriate software as well as by utilizing special hardware for each of the illustrated functions. A relatively inexpensive microcomputer may be combined with conventional memory chips and modem chips for providing the illustrated functions. Message routing may be performed utilizing conditional branches throughout the software for passing binary signals from one function to the next, as desired. Alternatively, special hardware may be used for performing select functions at speeds higher than those of the microcomputer if so desired. By way of example, a Zilog Z-8068 chip may be used for performing the encryption/decryption functions (272 and 282) at relatively high speed if so desired.

With respect to the message format converter 270 of FIG. 2 which converts English-like input commands from the local computer 111 into a format acceptable by the remote-site master power control unit 131, the message body 232 from the local computer 111 will preferably contain an ASCII character stream composed of an action verb followed by a separator character such as the equal symbol, "=" and the name of a remote-site appliance which is to be the target of the action verb. By way of example, the character string, "ON=A" indicates that the slave unit of appliance A1 will be turned on to apply full power to its corresponding appliance. The string "OFF=A2" indicates that the slave control unit of the designated appliance, A2, will shut off power to that appliance. The string "DM=A3" indicates that the designated slave controller will dim power to the designated appliance A3 (usually a lighting appliance such as 191 shown in FIG. 1). The target appliance designating code (i.e. A1, A2, A3) may vary depending on the power control system used. For example, the X-10 TM system requires a house code and unit number. The letter "A" designates a house code in the identification field of the remote slave unit and the numeral after the letter "A" designates a specific appliance that is associated with the house code. The following additional action verbs may be transmitted to the master unit 131:

| Action Verb | = | Description of Action |
| --- | --- | --- |
| RC | | Read Clock of remote master unit 131 |
| RG | | Read graphic data from remote master 131 |
| RH | | Read house code ("A") of the remote master unit 131 |
| RT | | Read timer or event state of the master unit 131 |
| SC | | Set the clock of the master control unit 131 to a new time |
| ST | | Activate a self-test mode in the master unit 131 |
| H | | Hang up the local modem 113 (remote modem 123 then hangs up automatically as a consequence) |
| LG | | Load graphic command data from the remote master unit 131 |
| LH | | Set a new house code for the remote unit |
| LT | | Load the remote timer with new timer data |

A modular code conversion technique contained in software is preferably used so that the English-like action verbs of the command strings will remain the same even if a different format is required by the master control unit 131 for the converted message because, for example, the power control units of a different vendor have been selected.

Figure 3:
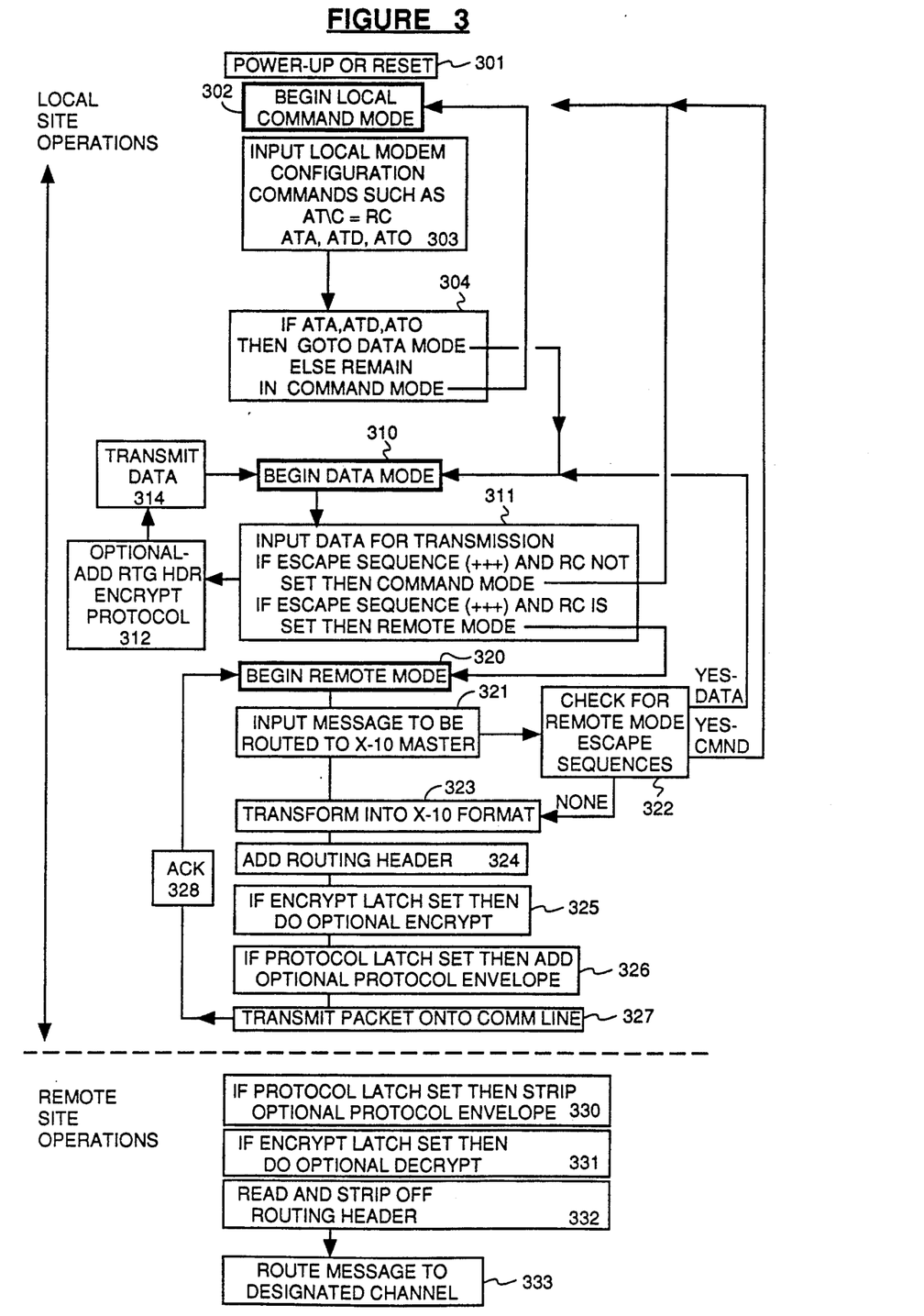
FIG. 3 is a flow chart of the operating modes of the local-site and remote-site modems shown in FIG. 1.

FIG. 3 is a flow chart showing how the switches from command mode to the data mode and to the remote mode are achieved. The beginning step 301 of the flow charted operation 300 shown in FIG. 3 is entered upon one of a power-up or reset conditions. At step 302, the local modem 113 automatically switches to the command mode. At step 303 of FIG. 3, a message 232 is input from the local computer 111. At step 304 the configuration module 250 tests the incoming message 232 to determine whether it is a special sequence which impliedly requests a switch to the data mode. Among such sequences which request an automatic switch to the data mode are "ATD 408-123-4567" which is a sequence that those skilled in the art will recognize as an automatic telephone dialing sequence to be sent to the telephone interface unit 115. Other escape sequences for entering the data submode are the answer and on-line commands, "ATA" and "ATO".

If at the decision step 304 it is found that the message 232 includes an appropriate escape sequence (i.e. ATA, ATD, ATO), then step 310 is entered to begin the data mode. At step 311 the next input message 232 is tested to see if it is a special escape sequence (+ + +). In this case the recognized escape sequence may include a prespecified time delay (pause) following the last received message, followed by a string of three identical characters (i.e., "+ + +") which is then followed a second prespecified time delay (pause). If such a special escape sequence is detected at step 311 and the RC latch is not set then control is returned to 302 where the local modem switches back to the command mode.

If the special escape sequence is not detected at step 311 then the received message body 232 is optionally compressed, encrypted and embedded within the protocol package stream 277 (the stream 277 including the protocol header stream 230, and protocol tail stream 234) and this is transmitted 314 over the communication channel 119 for routing to channel A or B at the remote site 120.

If the special escape sequence (i.e., pause + + + pause) is detected at step 311 and the RC latch (remote-control flag) is set, then control is passed to the remote mode which begins at step 320. At step 321 a message body 232 that is to be routed to an X-10 TM system at a remote site is input from channel A. At step 322 the input message is tested for a special escape sequence. If detected, the escape sequences cause the MFE to switch back to one of the data or command modes depending on information within the escape sequence. If no escape sequence is detected then at step 323 the input message body 232 is transformed into X-10 format by the format converting unit 270. At step 324 the routing header is added (the routing tail is optional). At step 325, the message core 277c is optionally encrypted depending on the setting of the encrypt bypass switch SW-4. At step 326 data-compression takes place and a protocol envelope is optionally added to the message core 277c* depending on the setting of the protocol bypass switch SW-5. At step 327, the thus formed information packet 277 is transmitted to the remote site. At step 328, the call-initiating modem 113 temporarily switches to the receive submode, waits for an acknowledgment response from the master power-control unit 131, and when this is properly received, the call-initiating MFE 113 switches back to the send submode and returns to step 320 to await receipt of the next command message from local computer 111 which is to be routed to the X-10 master control unit 131.

At the remote site, as shown in FIG. 3, a complementary set of operations take place. At step 330 the protocol envelope is optionally stripped and data-decompression takes place. At step 331 the optionally encrypted message core 277c* is decrypted and at step 332 the routing header is stripped off the message core 277c. At step 333 the message body 232 is routed to the designated channel in accordance with the routing information field that was included in the routing header 231.

Details about the conventional operating modes of the MFE will not be described here since such modes are well known. As indicated below, the MFE can be programmed to function in several ways. Each function or configuration will be dependent upon the types of applications. The MFE can function in the following manner:

1. A standard 2400 bauds Hayes ® AT-compatible external modem.
2. A standard encryption device.
3. A two-channel multiplexer.
4. A four-channel multipoint system.
5. A remote controller for computer or home.

In any of these configurations, the MFE device gives the user an option of data protection by way of encryption, and an option of assuring error-free communication and data compression by using the MNP TM protocol Instead of having to purchase separate pieces of equipment, such as a 4800/9600 Hayes ® AT-command compatible modem, an encryptor, a two-channel multiplexer together with a plurality of software packages (i.e., one for the error correction function and another for the data compression function) the MFE can do them all within one unit (enclosure) and thus save the user money, space and the headaches of figuring out how to connect those separate pieces of equipment together.

The preferred specifications for the MFE device are as follows:

1. Hayes ® AT-command Compatible modem

The MFE can function as a standard 2400 bauds Hayes ® AT-command compatible modem. (Hayes is a trademark of Hayes Microcomputer Products, Inc.) The MFE can handle transmission speeds from 300 to 2400 bauds,. It is a Bell 103/212A and CCITT V.22/V.22 bis compatible modem providing full/half duplex and synchronous/asynchronous transmission modes.

2. Encryptor

The MFE can be used to protect (secure) data and communications over tap-able lines by using the Data Encryption Standard (DES) of the U.S. National Bureau of Standard (NBS) to encrypt data. NBS DES is widely used in military, government, and financial institutions. The DES algorithm uses a 56-bit long key and thus has approximately 72,000,000,000,000,000 possible permutations. If an intruder wiretaps into the phone line, tries to use his computer to decrypt the DES encrypted data, it will take approximately 100 milliseconds for trying each possible key, and it will thus take the intruder an average of 114 million years to 228 million years to try all possible keys.

3/4. Multiplexer/Multi-point

The MFE has two RS232 channels (A and B) which allow two users (computers) each operating at 2400 bauds speed, to share the same telephone line (119) and send data to one or more computers at a remote site. The user can have four computers talking to each other in a multiplexed scheme (FIG. 4E) over one phone line. This is another feature that can save users costs for telephone usage as opposed to using two or more separate phone lines for such multi-point communications. The user can use extra channels on each MFE for operating a serial printer or other destination devices (i.e., monitor, storage, etc.) in a multi-point scheme as shown in FIG. 4F.

5. Remote Control

The MFE has an extra function not previously available with other modems. This is the ability of MFE (in combination with a commercially available X-10 ® system) to turn ON and OFF a remote computer located at home (or at the office) from a local office (or home), to be able to use the remote computer as if it were locally situated and to turn the remote computer off when you are done with your work. If you want to, you can also control any other of a plurality of appliances in your house from any site in the world that has telephone connection to your house. The MFE allows you to secure your home computer or home premises.

6. Data Compression

The MFE has the capability to compress your data before transmitting and decompress when receiving using the MNP TM protocol. This data compression can speed up data transmission between 160% to 250%. Therefore the actual throughput for data transfer at 2400 bauds rate can go up to an effective rate of 6000 bits per second. This feature will save you more than half of the cost in telephone connection.

7. Error-Correction

The MFE will guard the user's data files against data corruption caused by low quality telephone lines. In some case this data corruption can cause a lot of damage to your system or data base. The MFE has error correction capability that recognizes data corruption. When this occurs, the local MFE will let the remote MFE know and both MFE's will try to fix the error by retransmitting and rereceiving the messages automatically.

8. Easy to use

The MFE is designed to make it very easy to use and you don't need to be an expert in DES, error-correction, data compression or multiplexer schemes. All these features can be turned on or off during the command mode with easy to understand function-bypass commands in case you want to talk to a modem which is not an MFE.

9. Modem Specifications

| | |
|---|---|
| Audio Monitor: | Two inch speaker |
| Battery Backup: | To preserve system configuration |
| Command buffer: | 40 characters long |
| Command type: | Extended AT-command set |
| Compatibility: | Bell 103/212A, CCITT V.22/V.22 bis. |
| Data Format: | 5-8 data bits; odd, even or no parity, |

|                      |                                              |
| -------------------- | -------------------------------------------- |
|                      | 1 start bit; 1, 1.5, 2 stop bits             |
| Data throughput:     | Up to 6000 bits per second                   |
| Dialing Capability:  | Touch-tone or Rotary dial.                   |
| Flow Control:        | XON/XOFF                                     |
| Interface:           | Two female RS-232C connectors wired as DCE   |
| Operation:           | Full/half Duplex; Dial up/leased line.       |
|                      | Auto dial/answer, manual originate/answer.   |
| Protocol:            | MNP TM                                       |
| Rear Panel:          | One volume control.                          |
|                      | Two female modular phone connectors.         |
|                      | One female power connector                   |
|                      | Two female DB25 connectors                   |
| Receive Sensitivity: | −45 dBm                                      |
| Speed:               | 300 to 2400 bauds                            |
| Test Modes:          | Analog and Digital Loopback                  |
| Transmit Level:      | −10 dBm ± 1 dB                               |

10. Encryption Specifications

|                      |                                                    |
| -------------------- | -------------------------------------------------- |
| Initial Vectors:     | Encryption vector, Decryption vector               |
| Keys:                | Master, Encryption, Decryption keys.               |
|                      | All keys are retained when power shuts off.        |
|                      | No key/vector can be read back.                    |
| Methods:             | Electronic Code Book                               |
|                      | Cipher Block Chaining                              |
|                      | Cipher Feedback                                    |
| Password Protection: | Requires up to a 64-bit password to                |
|                      | turn on encryption mode, change keys or            |
|                      | change initial vectors.                            |
| Speed:               | Encrypt and decrypt in real time                   |
| Type:                | NBS DES                                            |

11. Data Compression Specifications

|         |                              |
| ------- | ---------------------------- |
| Method: | MNP5 ®                       |
| Gain:   | 160% to 250% speed improvement |

12. Other Specifications

|                     |                                           |
| ------------------- | ----------------------------------------- |
| FCC (pending):      | FCC Part 68 and Part 15 Sub-Part J for    |
|                     | Class B Computing Device                  |
| Environmental:      | Operating Temperature 0-50° C.            |
|                     | Relative Humidity 35% to 85% (non-condensing) |
| Physical Dimension  | Width: 7.8 inches (197.5 mm)              |
| of Enclosure:       | Length: 10.63 inches (270 mm)             |
|                     | Height: 1.66 inches (42 mm)               |
| Power Pack:         | U.L. listed, 120 VAC, 60 Hz, 25 Watts     |

It is to be understood that the above descriptions are merely exemplary of the principles of the present invention. Numerous variations and modifications will become apparent to those skilled in the art after studying the above disclosure. Examples of such variations include providing a message routing means having only two channels rather than the three A, B and C routing points shown for the switch SW-14 of FIG. 2. Alternatively more than three routing points may also be provided so that a MFE can service more than two external channels at a time. Moreover, various data compression, error correction and communication protocols other than the ones mentioned can be used. Mode escape sequences other than the ones mentioned may be further employed. Additionally, the order of the functional units 271-275 and 281-285 of FIG. 2 may be altered if desirable so that, for example, encryption occurs before the routing header and tail are added rather than after. In light of these possibilities, it should be understood that the above descriptions are not intended to limit the scope of the patent and that the scope of the patent is best determined by reference to the following claims.

What is claimed:

1. A control system for controlling the application of power to one or more power-dependent units at a remote site in accordance with power control messages transmitted from a local site to the remote site over an intersite communications channel which couples the two sites where the inter-site communications channel also carries other messages, the system comprising:

a power line extending through the remote site for supplying power to the power-dependent units;

master control means, located at the remote site and operatively coupled to the remote site power line, for transmitting power controlling signals through the remote site power line, the power controlling signals defining when and which of the one or more power-dependent units will receive power from the power line, the master control means having a master receiving port for receiving operation control commands which control operations of the master control means; and message routing means, located at the remote site and having first and second message routing channels both coupled to the inter-site communications channel, for receiving messages from the local site and selectively routing each received message onto one or the other of the first and second message routing channels, the first of the message routing channels including power-message relaying means, coupled to the master receiving port of the master control means, for generating in response to power control message received from the local site and for transmitting to the master control means the operation control commands which control the operations of the master control means, the second message routing channel being not coupled to the master receiving port of the master control means so that messages routed onto the second message routing channel cannot alter the operations of the master control means.

2. The control system of claim 1 further comprising one or more slave power control means located at the remote site, the one or more slave power control means being coupled to the remote site power line and the power-dependent units, for receiving the power controlling signals transmitted by the master power control means and for selectively supplying power from the power line to the one or more power-dependent units in response to the power controlling signals.

3. The control system of claim 2 wherein the message routing means selectively routes received ones of the other messages onto the second message routing channel and the control system further comprises a remote computer located at the remote site, the remote computer having a power connector connected to one of the slave power control means and a data communication line coupled to the second message routing channel of the message routing means for carrying the received ones of the other messages to the remote computer.

4. The control system of claim 1
wherein a duplicate message routing means, having a structure substantially identical to the remote site message routing means is located at the local site, the duplicate message routing means including a local first message routing channel and a local second message routing channel both coupled to the inter-site communications channel, and
wherein only one of said local first and local second channels carries all messages transmitted from the local site to the remote site.

5. The system of claim 4 wherein one or more remote-site computers are provided at the remote site and the second message routing channel of the remote site message routing means is coupled to the one or more remote site computers.

6. A method for controlling power application to electronic equipment located at a remote site in accordance with power-control messages transmitted over a shared communications line from a local site, where the shared communications line carries non-power messages in addition to the power-control messages, the method comprising the steps of:
defining at least two channels at the remote site, each channel being operatively coupled to the shared communications line to receive messages transmitted to the remote site over the shared communications line, at least one of the channels being a power control channel;
forming a message at the local site;
attaching message-routing information to the formed message, the message routing information designating one of the at least two channels as a target channel;
transmitting the formed message with the attached message-routing information from the local site to the remote site over the shared communications line; and
at the remote site, routing the transmitted message according to its message routing information onto the one channel designated as the target channel.

7. The method of claim 6 wherein the formed message is a power-control message and the message routing information designates the power control channel as the target channel.

8. The method of claim 6 wherein the formed message is a non-power message and the message routing information designates a channel other than the power control channel as its target.

9. The method of claim 6 further comprising the step of:
encrypting the combination of the formed message and the message routing information before transmitting it over the shared communications line.

10. The method of claim 9 further comprising the step of:
compressing said encrypted combination before transmitting it over the shared communications line.

11. The method of claim 6 further comprising the step of:
attaching error detection information at the local site to the combination of the formed message and the message routing information before transmitting it over the shared communications lines;
testing the error detection information at the remote site to detect a transmission error; and
performing the routing step at the remote site only if no transmission error is detected.

12. The control system of claim 1 further comprising:
message encrypting means at the local site for encrypting each message before the message is transmitted over the inter-site communications channel and
message decrypting means at the remote site for decrypting each received message.

13. The control system of claim 1 further comprising:
message encrypting means at the remote site for encrypting each message before the message is transmitted over the inter-site communications channel and
message decrypting means at the local site for decrypting each received message.

14. A remote control system where a remote site is coupled to a local site by an inter-site communications channel,
the remote control system being for selectively applying power at the remote site to one or more remote-site devices in accordance with power control messages transmitted from the local site, the system comprising at the remote site:
an AC power line for supplying alternating current power at the remote site;
a master power-control unit coupled to the AC power line;
one or more power-control slave units coupled to the AC power line;
a multi-channel modem, coupling the remote-site end of the inter-site communications channel to the master power-control unit and to the one or more remote-site devices, the multi-channel modem having one channel dedicated to transmitting control signals between the master power-control unit and the local site and a second channel dedicated to transmitting other signals between the one or more remote-site devices and the local site.

15. The remote control system of claim 14
wherein the master power-control unit has a predetermined first command format;
wherein the local site includes a command issuing computer whose power commands follow a predetermined second command format; and
wherein the local site further includes format conversion means for converting commands issued by the local site computer from the first command format to the second command format.

16. A remote control system for enabling a local site computer to control the application of power to and the operations of a remote site computer by sending power control and operation control signals over an inter-site communications channel coupling the local site to the remote site, the system comprising:
a local modem located at the local site for coupling the local site computer to the inter-site communications channel;
a remote modem located at the remote site, the remote modem having an inter-site port coupled to the inter-site communications channel, a first port coupled to the remote site computer, a second port, and signal routing means for routing signals passing through the inter-site port to one or the other of the first and second remote modem ports; and programmable power supplying means located at the remote site and coupled to the second port of the remote modem for receiving power control signals from the second port of the remote modem, the power supplying means being further coupled to the remote site computer for selectively supplying power to the remote site computer in accordance with the power control signals received from the second port of the remote modem.

17. The system of claim 16 wherein the inter-site communications channel includes a telephone line.

18. The system of claim 16 wherein the programmable power supplying means includes an AC power line, one or more slave units coupled to the power line and a master unit coupled to the power line for controlling the slave units by way of signals transmitted over the power line.

19. The system of claim 16 further comprising a second remote site computer coupled to the first port of the remote modem for receiving operation control signals from the first port, the second remote site computer being further coupled to the power supplying means for receiving power therefrom at selected times.

20. A method of supplying power to and controlling the operations of a remote site computer from a local site computer, the method comprising the steps of:
providing a local modem at the local site coupled to the local site computer;
providing a multi-channel remote modem at the remote site with a first channel of the remote modem being coupled to an operations controlling port of the remote site computer;
providing a programmable power supply at the remote site coupled to a second channel of the remote site modem for selectively supplying power to the remote site computer in accordance with power control signals conducted by the second channel;
commanding the local modem to call the remote modem;
when the remote modem answers commanding the remote modem, by way of command messages sent through the local modem, to route received messages to the second channel of the remote modem;
sending a power-on command from the local computer through the local modem and through the second channel of the remote modem for causing the remote site power supply to supply power to the remote site computer;
after power is supplied to the remote site computer, commanding the remote modem to route messages between the local modem and the first channel of the remote modem; and
sending operation control signals to operate the turned-on remote computer over the first channel of the remote modem.

21. The method of claim 20 further comprising the steps of:
encrypting and compressing messages within the local modem before sending them to the remote modem; and
decompressing and decrypting messages received from the local modem within the remote modem.

22. The method of claim 20 further comprising the steps of:
encrypting and compressing messages within the remote modem before sending them to the local modem; and
decompressing and decrypting messages received from the remote modem within the local modem.

23. The method claim 20 further comprising the steps of:
after operation control signals are sent over the first channel of the remote modem, commanding the remote modem to route messages between the local modem and the second channel of the remote modem; and
sending a power-off command from the local computer through the local modem and through the second channel of the remote modem for causing the remote site power supply to discontinue the supply of power to the remote site computer.

* * * * *